United States Patent

Huang

(10) Patent No.: US 9,239,478 B2
(45) Date of Patent: Jan. 19, 2016

(54) ELECTRO-OPTIC MODULATOR HAVING RIDGE WAVEGUIDE STRUCTURE

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 118 days.

(21) Appl. No.: 14/138,152

(22) Filed: Dec. 23, 2013

(65) Prior Publication Data

US 2014/0355923 A1  Dec. 4, 2014

(30) Foreign Application Priority Data

Jun. 4, 2013 (TW) .................................. 102119845

(51) Int. Cl.
*G02F 1/035* (2006.01)
*G02B 6/10* (2006.01)
*G02F 1/21* (2006.01)
*G02F 1/225* (2006.01)
*G02B 6/125* (2006.01)
*G02B 6/134* (2006.01)
*G02B 6/122* (2006.01)

(52) U.S. Cl.
CPC ........ *G02F 1/035* (2013.01); *G02B 6/10* (2013.01); *G02B 6/122* (2013.01); *G02B 6/125* (2013.01); *G02B 6/1342* (2013.01); *G02F 1/21* (2013.01); *G02F 1/225* (2013.01); *G02F 1/2257* (2013.01); *G02F 2201/063* (2013.01)

(58) Field of Classification Search
CPC .......... G02B 6/10; G02B 6/122; G02B 6/125; G02B 6/13; G02B 6/1342; G02F 1/21; G02F 1/035; G02F 1/0356; G02F 1/225; G02F 1/2257; G02F 2001/212
USPC ................................................... 385/1–3, 132
See application file for complete search history.

(56) References Cited

U.S. PATENT DOCUMENTS

2011/0103735 A1*  5/2011  Oikawa et al. .................... 385/3

* cited by examiner

*Primary Examiner* — Akm Enayet Ullah
*Assistant Examiner* — Michael Mooney
(74) *Attorney, Agent, or Firm* — Novak Druce Connolly Bove + Quigg LLP

(57) ABSTRACT

A ridge waveguide structure includes a substrate having a top surface; a ridge structure protruding from the top surface; and a waveguide formed in the ridge structure and a shape of the waveguide is corresponding to a shape of the ridge structure; the ridge structure includes a Y-shaped input section and a Y-shaped output section, the Y-shaped input section includes a total input section, a first branch and a second branch, the first branch and the second branch are diverged from the total input section and converged into the Y-shaped output section. The relation also relates to an electro-optic modulator.

20 Claims, 3 Drawing Sheets of a segment that is smaller than a semicircle. In this embodiment, a height of the ridge structure 12 is about 3-4 microns, and a height of the waveguide 13 is about 0.6-0.8 microns. The waveguide 13 is formed in the ridge structure 12 using high temperature diffusion technology. The diffusion temperature is about 1020° C. In a preferred embodiment, the waveguide 13 is made of titanium.

ELECTRO-OPTIC MODULATOR HAVING RIDGE WAVEGUIDE STRUCTURE

BACKGROUND

1. Technical Field

The present disclosure relates to an electro-optic modulator having a ridge waveguide structure, wherein the electro-optic modulator can achieve a high extinction ratio when functioning as an optical switch.

2. Description of Related Art

Electro-optic modulators, such as Mach-Zehner electro-optic modulators, change a refractive index of a branch (hereinafter "the first sub-branch") of a Y-shaped waveguide by employing a modulating electric field, which utilizes the electro-optic effect. Thus, the modulator can alter a phase of light waves traversing the first sub-branch. As a result, the phase of light waves traversing the first sub-branch can be shifted and thus interfere with light waves traversing another branch (hereinafter "the third sub-branch") of the Y-shaped waveguide. An output of the Y-shaped waveguide is modulated as the power output depending on the phase shift, which in turn depends on the modulating electric field. However, due to manufacturing imprecision inherent in an electro-optic modulator, the properties of the light waves respectively traversing the first and third sub-branches are not equal to each other. As such, when the electro-optic modulator is used as an optical switch, the power output is often larger than zero in an off state, or is less than a desired maximum value in an on state. That is, an extinction ratio of the optical switch may be less than what is considered to be satisfactory.

Therefore, it is desirable to provide an electro-optic modulator that can overcome the above-mentioned problems.

DETAILED DESCRIPTION

Figure 1:
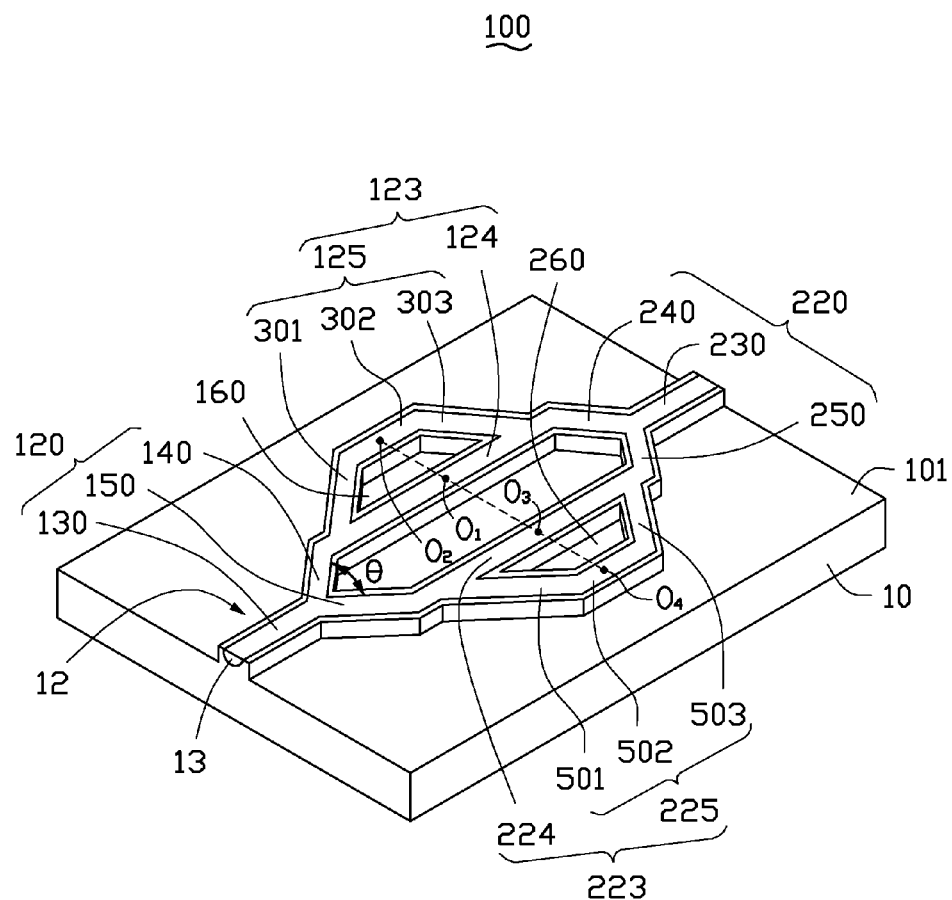
FIG. 1 is an isometric view of a ridge waveguide structure according to a first embodiment of the present invention.

FIG. 1 shows a ridge waveguide structure 100 according to a first embodiment. The ridge waveguide structure 100 includes a substrate 10 defining a top surface 101, a ridge structure 12 protruding from the top surface 101, and a waveguide 13 formed in the ridge structure 12. The substrate 10 is made of lithium niobate ($LiNbO_3$) or barium niobate ($BaNbO_3$).

A top surface of the ridge structure 12 is hollow, thereby defining a series of channels in the ridge structure 12. The waveguide 13 is filled in the channels. A top surface of the waveguide 13 is substantially coplanar with the top surface of the ridge structure 12. Thus a shape of the waveguide 13 corresponds to a shape of the ridge structure 12. A width of the waveguide 13 is less than a width of the ridge structure 12, and a height of the waveguide 13 is less than a height of the ridge structure 12. In the illustrated embodiment, a transverse cross-section of any part of the ridge structure 12 defines four sides of a rectangle, with part of a top side of the rectangle recessed where the channel is located. A transverse cross-section of the channel defines a semicircle, or a segment that is smaller than a semicircle. Correspondingly, a transverse cross-section of any part of the waveguide 13 is a semicircle, The ridge structure 12 includes a Y-shaped input section 120, a first sub-Y-shaped section 123, a second sub-Y-shaped section 223, and a Y-shaped output section 220. The Y-shaped input section 120 includes a total input section 130, a first branch 140, and a second branch 150. The first branch 140 and the second branch 150 diverge from the total input section 130, and converge into the Y-shaped output section 220. The first branch 140 and the second branch 150 have the same length. The length of the first branch 140 is in the range of from about 0.5 centimeters to about 1.0 centimeters. An included angle θ between the first branch 140 and the second branch 150 is not more than 2°. In a preferred embodiment, the included angle θ is about 1°.

The first branch 140 includes a first sub-Y-shaped section 123. The first sub-Y-shaped section 123 includes a first sub-branch 124 and a second sub-branch 125. The second sub-branch 125 includes a first section 301, a second section 302 and a third section 303. The first section 301 and the second sub-branch 125 diverge from the first branch 140. The second section 302 interconnects the first section 301 and the third section 303, and the second section 303 is parallel to the first sub-branch 124.

The second sub-Y-shaped section 223 includes a third sub-branch 224 and a fourth sub-branch 225. The fourth sub-branch 225 includes a fourth section 501, a fifth section 502 and a sixth section 503. The fifth section 502 interconnects the fourth section 501 and the sixth section 503, and the fifth section 503 is parallel to the third sub-branch 224. In this embodiment, the second sub-branch 125 and the fourth sub-branch 225 are positioned at two opposite sides of the combination of the first sub-branch 124 and the third sub-branch 224. The first sub-branch 124 and the second sub-branch 125 cooperatively define a first recess 160 therebetween. The third sub-branch 224 and the fourth sub-branch 225 cooperatively define a second recess 260 therebetween. A center O2 of the second section 302, a center O1 of the first sub-branch 124, a center O3 of the second sub-branch 224, and a center O4 of the fifth section 502 all lie on a same straight imaginary line.

The Y-shaped output section 220 includes a total output section 230, a first output section 240, and a second output section 250. The third section 303 and the first sub-branch 124 converge into the first output section 240. The sixth section 503 and the third sub-branch 224 converge into the second output section 250. The first output section 240 and the second output section 250 converge into the total output section 230. The third sub-branch 224 extends in a straight line and is coupled to the first branch 140 and the first output section 240.

Figure 2:
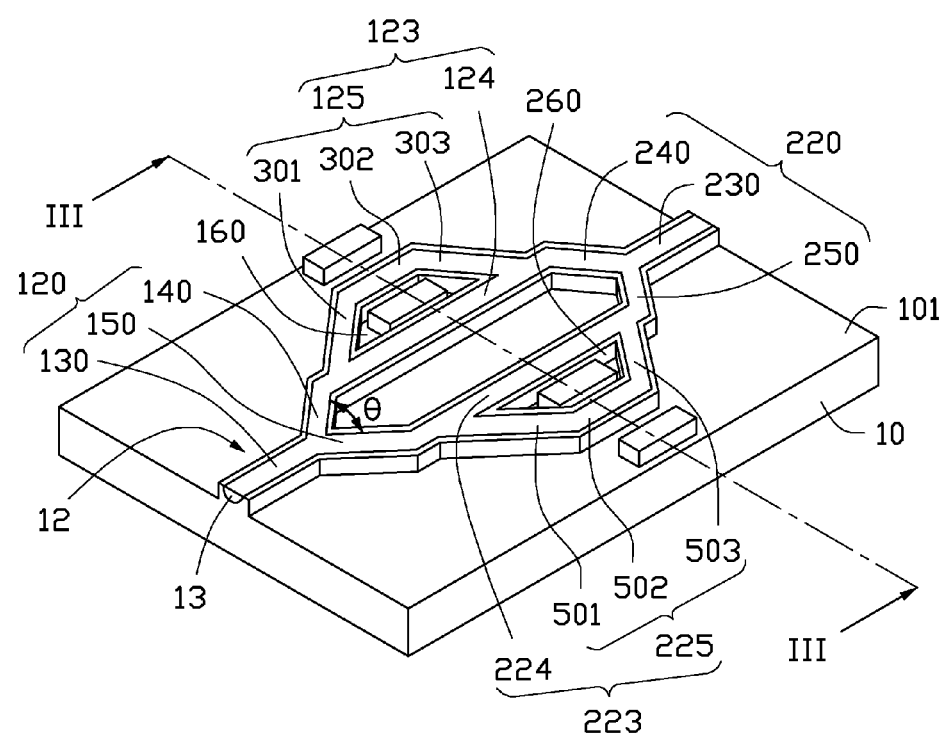
FIG. 2 is an isometric view of an electro-optic modulator according to a second embodiment of the present invention.
Figure 3:
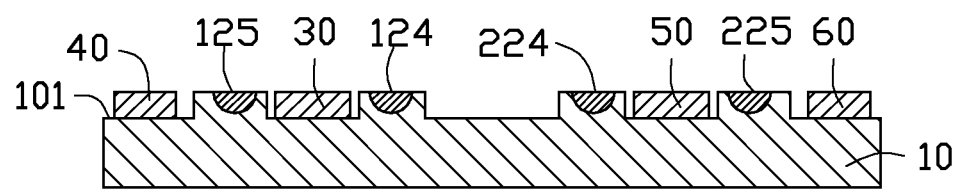
FIG. 3 is a cross-sectional view taken along a line III-III of FIG. 2.

FIGS. 2-3 show an electro-optic modulator 200 according to a second embodiment. The electro-optic modulator 200 includes the ridge waveguide structure 100, a first electrode 30, a second electrode 40, a third electrode 50, and a fourth electrode 60. The first electrode 30, the second electrode 40, the third electrode 50 and the fourth electrode 60 are strip-shaped. The first electrode 30 and the third electrode 50 have a same size, and the second electrode 40 and the fourth electrode 60 have a same size. The first, second, third and fourth electrodes 30, 40, 50, 60 are made of metal, and are all formed on the top surface 101 by a vacuum sputtering method.

The first electrode 30 is located in the first recess 160. The second electrode 40 is located beside the second sub-branch 125. The third electrode 50 is located in the second recess 260. The fourth electrode 60 is located beside the fourth sub-branch 225. Centers of the first electrode 30, the second electrode 40, the third electrode 50, and the fourth electrode 60 all lie on a same straight imaginary line. In this embodiment, the first and third electrodes 30, 50 are connected with ground, respectively; and the second and fourth electrodes 40, 60 are connected with a high potential, respectively. The first electrode 30 and the second electrode 40 are configured for cooperatively modulating the power output of the first output section 230. The third electrode 50 and the fourth electrode 60 are configured for cooperatively modulating the power output of the second output section 240.

In principle, the light waves traversing in the total output section 230 can be expressed by the following equation:

$$\alpha e^{i(\alpha - wt)} = \alpha_1 e^{i(\phi - wt)} + \alpha_2 e^{i(\beta - wt)},$$

wherein, $\alpha$, $\alpha_1$, and $\alpha_2$ are amplitudes of light waves traversing in the total output section 230, the first output section 240, and the second output section 250, respectively; $\alpha$, $\phi$, and $\beta$ are phases of light waves traversing in the total output section 230, the first output section 240, and the second output section 250, respectively; e is the base of a natural logarithm exponent; i is an imaginary unit ($i^2 = -1$); $\omega$ is an angular velocity; and t is a time variable.

The power output of the total output section 230 can be calculated by the following equation:

$$S = \alpha^2 = \alpha_1^2 + \alpha_2^2 + 2\alpha_1 \alpha_2 \cos(\phi - \beta),$$

wherein S is the power output of the total output section 230.

Similarly, the power outputs of the first and second output sections 240, 250 can be calculated by the following equations:

$$\alpha_1 e^{i(\phi - wt)} = \alpha_{11} e^{i(\phi_1 - wt)} + \alpha_{12} e^{i(\phi_2 - wt)},$$

$$Q_1 = \alpha_1^2 = \alpha_{11}^2 \alpha_{12}^2 + 2\alpha_{11} \alpha_{12} \cos(\phi_1 - \phi_2),$$

$$\alpha_2 e^{i(\phi - wt)} = \alpha_{21} e^{i(\beta_1 - wt)} + \alpha_{22} e^{i(\beta_2 - wt)}, \text{ and}$$

$$Q_2 = \alpha_2^2 = \alpha_{21}^2 + \alpha_{22}^2 + 2\alpha_{21} \alpha_{22} \cos(\beta_1 - \beta_2),$$

wherein $\alpha_{11}$, $\alpha_{12}$, $\alpha_{21}$, and $\alpha_{22}$ are amplitudes of light waves traversing the first through fourth sub-branches 124, 125, 224, 225, respectively; $\phi_1$, $\phi_2$, $\beta_1$, and $\beta_2$, are phases of light waves traversing the first through fourth sub-branches 124, 125, 224, 225, respectively; and $Q_1$ and $Q_2$ are the respective output powers of the first and second output sections 240, 250.

By changing the amplitudes $\alpha_{11}$, $\alpha_{12}$, $\alpha_{21}$, and $\alpha_{22}$ and the phases $\phi_1$, $\phi_2$, $\beta_1$, and $\beta_2$, the following equations can be realized: Q1=0 (when $\phi_1 - \phi_2 = \pi$ and $\alpha_{11} = \alpha_{12}$); and Q2=0 (when $\beta_1 - \beta_2 = \pi$ and $\alpha_{21} = \alpha_{22}$). Thus S=0 can be realized. When $\phi - \beta = 0$, a desired maximum value of S can be realized. As such, when the modulator 200 is used as an optical switch, the power output of the waveguide 13 is at zero in an off-state, and substantially reaches a desired maximum value in an on state. Thus an extinction ratio of the modulator 200 is increased.

In summary, the waveguide 13 is limited in the ridge structure 12. Variation of the refractive index is larger than in a conventional planar optical waveguide, and crosstalk of light waves between adjacent sub-branches and/or branches can be avoided. The power output of the first output section 240 is modulated by the first sub-branch 124 and the second sub-branch 125. The power output of the second output section 250 is modulated by the third sub-branch 224 and the fourth sub-branch 225. By changing the phases of light waves traversing in the first through fourth sub-branches 124, 125, 224, 225, the modulator 200 can be used as an optical switch.

It is to be understood that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A ridge waveguide structure comprising:
a substrate comprising a top surface;
a ridge structure protruding from the top surface; and
a waveguide formed in the ridge structure, a shape of the waveguide corresponding to a shape of the ridge structure;
the ridge structure comprising a Y-shaped input section and a Y-shaped output section, the Y-shaped input section comprising a total input section, a first branch and a second branch, the first branch and the second branch diverging from the total input section and converging into the Y-shaped output section;
the first branch comprising a first sub-Y-shaped section, the second branch comprising a second sub-Y-shaped section, the first sub-Y-shaped section comprising a first sub-branch and a second sub-branch, the second sub-Y-shaped section comprising a third sub-branch and a fourth sub-branch;
the second sub-branch and the fourth sub-branch being positioned at two opposite sides of the combination of the first sub-branch and the third sub-branch;
the third sub-branch extending in a straight line and being coupled to the first branch and the first output section; and
the first sub-branch and the second sub-branch cooperatively defining a first recess therebetween, and the third sub-branch and the fourth sub-branch cooperatively defining a second recess therebetween.

2. The ridge waveguide structure of claim 1, wherein the second sub-branch comprises a first section, a second section and a third section, the second section connects the first section and the third section, and the second section is parallel to the first sub-branch.

3. The ridge waveguide structure of claim 2, wherein the fourth sub-branch comprises a fourth section, a fifth section and a sixth section, the fifth section connects the fourth section and the sixth section, and the fifth section is parallel to the third sub-branch.

4. The ridge waveguide structure of claim 3, wherein the Y-shaped output section comprises a first output section, a second output section and a total output section, the third section and the first sub-branch converge into the first output section, the sixth section and the third sub-branch converge into the second output section, and the first output section and the second output section converge into the total output section.

5. The ridge waveguide structure of claim 1, wherein the waveguide is diffused in the ridge structure.

6. The ridge waveguide structure of claim 1, wherein the substrate is made of one of lithium niobate ($LiNbO_3$) and barium niobate ($BaNbO_3$).

7. The ridge waveguide structure of claim 1, wherein the first branch and the second branch have a same length.

8. The ridge waveguide structure of claim 7, wherein the length of the first branch is in the range of from about 0.5 centimeters to about 1 centimeter.

9. The ridge waveguide structure of claim 8, wherein an included angle between the first branch and the second branch is not more than 2°.

10. The ridge waveguide structure of claim 3, wherein centers of the second section, the first sub-branch, the second sub-branch and the fifth section all lie on a same straight line.

11. An electro-optic modulator comprising:
a substrate comprising a top surface;
a ridge waveguide structure formed on the top surface, and comprising a ridge structure and a waveguide formed in the ridge structure;
the ridge structure comprising a Y-shaped input section and a Y-shaped output section, the Y-shaped input section comprising a total input section, a first branch and a second branch, the first branch and the second branch diverging from the total input section and converging into the Y-shaped output section;
the first branch comprising a first sub-Y-shaped section, the second branch comprising a second sub-Y-shaped section, the first sub-Y-shaped section comprising a first sub-branch and a second sub-branch, the second sub-Y-shaped section comprising a third sub-branch and a fourth sub-branch;
the second sub-branch and the fourth sub-branch being positioned at two opposite sides of the combination of the first sub-branch and the third sub-branch;
the third sub-branch extending in a straight line and being coupled to the first branch and the first output section; and
the first sub-branch and the second sub-branch cooperatively defining a first recess therebetween, and the third sub-branch and the fourth sub-branch cooperatively defining a second recess therebetween;
a first ground electrode arranged in the first recess;
a first modulating electrode beside the second sub-branch;
a second ground electrode arranged in the second recess; and
a second modulating electrode beside the fourth sub-branch.

12. The electro-optic modulator of claim 11, wherein the second sub-branch comprises a first section, a second section and a third section, the second section connects the first section and the third section, the second section is parallel to the first sub-branch.

13. The electro-optic modulator of claim 11, wherein the fourth sub-branch comprises a fourth section, a fifth section and a sixth section, the fifth section connects the fourth section and the sixth section, the fifth section is parallel to the third sub-branch.

14. The electro-optic modulator of claim 11, wherein the Y-shaped output section comprises a first output section, a second output section and a total output section, the third section and the first sub-branch are converged into the first output section, the sixth section and the third sub-branch are converged into the second output section, the first output section and the second output section are converged into the total output section.

15. The electro-optic modulator of claim 11, wherein the first electrode and the third electrode have a same size.

16. The electro-optic modulator of claim 15, wherein the first modulating electrode and the fourth electrode have a same size.

17. The electro-optic modulator of claim 16, wherein the first branch and the second branch have a same length.

18. The electro-optic modulator of claim 17, wherein the length of the first branch is in the range of from about 0.5 centimeter to about 1 centimeter.

19. The electro-optic modulator of claim 18, wherein the included angle between the first branch and the second branch is not more than 2°.

20. The electro-optic modulator of claim 18, wherein centers of the second section, the first sub-branch, the second sub-branch and the fifth section all lie on a same straight line.

* * * * *